US012561681B2

(12) United States Patent
Bomko et al.

(10) Patent No.: US 12,561,681 B2
(45) Date of Patent: Feb. 24, 2026

(54) ACQUISITION OF DIGITAL ASSETS ON A BLOCKCHAIN USING OFF-CHAIN VALUATION AND AUTHORIZATION

(71) Applicant: Unstoppable Domains, Inc., Las Vegas, NV (US)

(72) Inventors: Sergii Bomko, Kyiv (UA); Lisa Seacat DeLuca, Bozeman, MT (US); Matthew Gould, Atlanta, GA (US); Bogdan Gusiev, Kiev (UA); Mykyta Shatilo, Lisbon (PT)

(73) Assignee: Unstoppable Domains, Inc., Las Vegas, NV (US)

( * ) Notice: Subject to any disclaimer, the term of this patent is extended or adjusted under 35 U.S.C. 154(b) by 45 days.

(21) Appl. No.: 18/497,009

(22) Filed: Oct. 30, 2023

(65) Prior Publication Data

US 2025/0139617 A1 May 1, 2025

(51) Int. Cl.
*G06Q 20/38* (2012.01)
*G06Q 20/40* (2012.01)

(52) U.S. Cl.
CPC ....... *G06Q 20/389* (2013.01); *G06Q 20/3825* (2013.01); *G06Q 20/401* (2013.01)

(58) Field of Classification Search
CPC . G06Q 20/389; G06Q 20/3825; G06Q 20/401
See application file for complete search history.

(56) References Cited

U.S. PATENT DOCUMENTS

| 7,548,968 B1 | 6/2009 | Bura et al. |
| 7,664,831 B2 | 2/2010 | Cartmell et al. |
| 7,698,425 B2 | 4/2010 | Thayer et al. |

(Continued)

FOREIGN PATENT DOCUMENTS

| CN | 1984185 A | 6/2007 |
| CN | 113221166 A | 8/2021 |

(Continued)

OTHER PUBLICATIONS

Bruce Schneier; Applied Cryptography (Year: 1996).*

(Continued)

*Primary Examiner* — Steven S Kim
(74) *Attorney, Agent, or Firm* — Edell, Shapiro & Finnan, LLC

(57) ABSTRACT

According to a present invention embodiment, a system for acquiring a digital asset on a blockchain comprises one or more memories and at least one processor coupled to the one or more memories. The system receives transaction information for a transaction to acquire the digital asset on the blockchain. The transaction information including a value for acquiring the digital asset is verified based on authentication information. Off-chain processing determines a dynamically changing value for acquiring the digital asset and produces the authentication information based on the dynamically changing value. The transaction is performed on the blockchain to acquire the digital asset in response to verification of the transaction information. Embodiments of the present invention further include a method and computer program product for acquiring a digital asset on a blockchain in substantially the same manner described above.

21 Claims, 6 Drawing Sheets

(56) References Cited

U.S. PATENT DOCUMENTS

| | | | |
|---|---|---|---|
| 7,756,987 B2 | 7/2010 | Wang et al. | |
| 8,010,674 B2 | 8/2011 | Fong | |
| 8,239,677 B2 | 8/2012 | Colson | |
| 8,276,057 B2 | 9/2012 | Rowe et al. | |
| 8,285,830 B1 | 10/2012 | Stout et al. | |
| 8,312,364 B2 | 11/2012 | Rowe et al. | |
| 8,738,604 B2 | 5/2014 | Devarajan et al. | |
| 8,751,586 B2 | 6/2014 | Adelman et al. | |
| 8,886,747 B1 | 11/2014 | Chen et al. | |
| 8,904,040 B2 | 12/2014 | Adelman et al. | |
| 9,521,139 B2 | 12/2016 | Lee et al. | |
| 9,553,981 B2 | 1/2017 | Czarnecki et al. | |
| 9,779,125 B2 | 10/2017 | Gupta | |
| 9,785,663 B2 | 10/2017 | Gupta | |
| 10,123,202 B1 | 11/2018 | Polehn et al. | |
| 10,178,069 B2 | 1/2019 | Li et al. | |
| 10,296,569 B2 | 5/2019 | Akkarawittayapoom | |
| 10,382,388 B2 | 8/2019 | Li et al. | |
| 10,432,584 B1 | 10/2019 | Raman et al. | |
| 10,505,980 B2 | 12/2019 | Child et al. | |
| 10,601,829 B1 | 3/2020 | Nelson et al. | |
| 10,708,042 B1 | 7/2020 | Rubenstein et al. | |
| 10,826,685 B1 | 11/2020 | Campagna | |
| 10,841,307 B2 | 11/2020 | Smith et al. | |
| 10,846,762 B1 | 11/2020 | Dennis et al. | |
| 10,856,122 B2 | 12/2020 | Smith et al. | |
| 11,159,326 B1 | 10/2021 | Nelson et al. | |
| 11,190,355 B2 | 11/2021 | Wang | |
| 11,196,573 B2 | 12/2021 | Roennow et al. | |
| 11,223,617 B2 | 1/2022 | Blinn et al. | |
| 11,303,610 B2 | 4/2022 | Kamdar et al. | |
| 11,356,479 B2 | 6/2022 | Prakash et al. | |
| 11,388,165 B2 | 7/2022 | Epstein et al. | |
| 11,507,945 B2 * | 11/2022 | Talmor | G06Q 20/065 |
| 11,552,923 B2 | 1/2023 | Stahura et al. | |
| 11,558,334 B2 | 1/2023 | Pezeshki et al. | |
| 11,558,344 B1 | 1/2023 | Pezeshki et al. | |
| 11,750,570 B1 | 9/2023 | Eby et al. | |
| 11,830,330 B1 | 11/2023 | Island et al. | |
| 11,870,750 B1 | 1/2024 | Shah et al. | |
| 11,876,774 B2 | 1/2024 | Pezeshki et al. | |
| 11,876,801 B2 | 1/2024 | Smith et al. | |
| 11,886,425 B2 | 1/2024 | Pezeshki et al. | |
| 12,099,978 B2 | 9/2024 | Bukov et al. | |
| 12,147,978 B2 * | 11/2024 | Gauvreau, Jr. | G06Q 20/389 |
| 12,278,800 B2 | 4/2025 | Pezeshki et al. | |
| 2002/0065903 A1 | 5/2002 | Fellman | |
| 2006/0218289 A1 | 9/2006 | Assad | |
| 2007/0294431 A1 | 12/2007 | Adelman et al. | |
| 2010/0325128 A1 | 12/2010 | Adelman et al. | |
| 2011/0055248 A1 | 3/2011 | Consuegra et al. | |
| 2011/0055331 A1 | 3/2011 | Adelman et al. | |
| 2011/0055562 A1 | 3/2011 | Adelman et al. | |
| 2012/0072572 A1 | 3/2012 | Bladel | |
| 2012/0166935 A1 | 6/2012 | Abhyanker | |
| 2013/0262416 A1 | 10/2013 | Devarajan et al. | |
| 2013/0326368 A1 | 12/2013 | Voas et al. | |
| 2014/0188681 A1 | 7/2014 | Shahghasemi | |
| 2014/0283106 A1 | 9/2014 | Stahura et al. | |
| 2015/0100507 A1 | 4/2015 | Levac et al. | |
| 2015/0302053 A1 | 10/2015 | Mitnick et al. | |
| 2015/0356523 A1 | 12/2015 | Madden | |
| 2016/0055490 A1 | 2/2016 | Keren et al. | |
| 2016/0140653 A1 * | 5/2016 | McKenzie | G07F 7/082 705/69 |
| 2016/0217436 A1 | 7/2016 | Brama | |
| 2016/0241510 A1 | 8/2016 | Kamdar et al. | |
| 2016/0241628 A1 | 8/2016 | Seren et al. | |
| 2016/0330027 A1 | 11/2016 | Ebrahimi | |
| 2017/0132626 A1 | 5/2017 | Kennedy | |
| 2017/0236123 A1 | 8/2017 | Ali et al. | |
| 2017/0331896 A1 | 11/2017 | Holloway et al. | |
| 2017/0372300 A1 * | 12/2017 | Dunlevy | G06Q 20/363 |
| 2018/0246983 A1 | 8/2018 | Rathod | |
| 2019/0028432 A1 | 1/2019 | Li et al. | |
| 2019/0096021 A1 | 3/2019 | Jarvis et al. | |
| 2019/0130399 A1 | 5/2019 | Wright et al. | |
| 2019/0163887 A1 | 5/2019 | Frederick et al. | |
| 2019/0165930 A1 | 5/2019 | Castinado et al. | |
| 2019/0279204 A1 | 9/2019 | Norton et al. | |
| 2019/0306158 A1 | 10/2019 | Jain | |
| 2019/0340607 A1 | 11/2019 | Lynn et al. | |
| 2020/0019680 A1 | 1/2020 | Frederick et al. | |
| 2020/0036707 A1 | 1/2020 | Callahan et al. | |
| 2020/0097862 A1 | 3/2020 | Arora et al. | |
| 2020/0143466 A1 | 5/2020 | Wu et al. | |
| 2020/0145373 A1 | 5/2020 | Richardson | |
| 2020/0186338 A1 | 6/2020 | Andon et al. | |
| 2020/0202668 A1 | 6/2020 | Cotta | |
| 2020/0250676 A1 * | 8/2020 | Sierra | G06Q 20/3825 |
| 2020/0313867 A1 | 10/2020 | Yu | |
| 2020/0351075 A1 | 11/2020 | Griffin et al. | |
| 2020/0403961 A1 | 12/2020 | Gaydos et al. | |
| 2020/0406859 A1 | 12/2020 | Hassani | |
| 2020/0409942 A1 | 12/2020 | Kasimov et al. | |
| 2021/0058353 A1 | 2/2021 | Creech et al. | |
| 2021/0125128 A1 | 4/2021 | Martin et al. | |
| 2021/0256070 A1 | 8/2021 | Tran et al. | |
| 2021/0297265 A1 | 9/2021 | Huang et al. | |
| 2021/0304191 A1 | 9/2021 | O'Grady | |
| 2021/0357489 A1 | 11/2021 | Tali et al. | |
| 2021/0374693 A1 | 12/2021 | La Salle | |
| 2021/0374731 A1 * | 12/2021 | Kim | G06Q 20/3829 |
| 2022/0021537 A1 | 1/2022 | Wagner et al. | |
| 2022/0103370 A1 | 3/2022 | Alwen et al. | |
| 2022/0103512 A1 | 3/2022 | Zeng et al. | |
| 2022/0131844 A1 | 4/2022 | Sherlock et al. | |
| 2022/0147988 A1 | 5/2022 | Alexa et al. | |
| 2022/0164815 A1 | 5/2022 | Petersen et al. | |
| 2022/0173893 A1 | 6/2022 | Basu et al. | |
| 2022/0198049 A1 | 6/2022 | Dumas et al. | |
| 2022/0198444 A1 | 6/2022 | Mee et al. | |
| 2022/0201036 A1 | 6/2022 | Nabeel et al. | |
| 2022/0222245 A1 | 7/2022 | Pezeshki et al. | |
| 2022/0261882 A1 | 8/2022 | Youb et al. | |
| 2022/0294630 A1 * | 9/2022 | Collen | H04L 9/3213 |
| 2022/0309491 A1 | 9/2022 | Shapiro et al. | |
| 2022/0342958 A1 | 10/2022 | Lillard et al. | |
| 2022/0376889 A1 | 11/2022 | Kaizer et al. | |
| 2022/0383296 A1 | 12/2022 | Gottschalk | |
| 2022/0393881 A1 | 12/2022 | Ow et al. | |
| 2023/0006976 A1 | 1/2023 | Jakobsson et al. | |
| 2023/0057438 A1 | 2/2023 | Chen et al. | |
| 2023/0171225 A1 | 6/2023 | Pezeshki et al. | |
| 2023/0206218 A1 | 6/2023 | Defour | |
| 2023/0230054 A1 | 7/2023 | Livesay | |
| 2023/0252431 A1 * | 8/2023 | Mecci | G06Q 50/184 705/44 |
| 2023/0289749 A1 | 9/2023 | Jain et al. | |
| 2023/0306443 A1 | 9/2023 | Murphy | |
| 2023/0336523 A1 | 10/2023 | DeLuca et al. | |
| 2023/0360031 A1 | 11/2023 | DeLuca et al. | |
| 2023/0388179 A1 | 11/2023 | Li et al. | |
| 2023/0396610 A1 | 12/2023 | Berry et al. | |
| 2023/0403154 A1 | 12/2023 | Kaizer et al. | |
| 2023/0403254 A1 | 12/2023 | Kaizer et al. | |
| 2023/0418979 A1 | 12/2023 | DeLuca et al. | |
| 2023/0419403 A1 | 12/2023 | Rapowitz et al. | |
| 2023/0421399 A1 | 12/2023 | Quirk et al. | |
| 2023/0421570 A1 | 12/2023 | Gould et al. | |
| 2024/0037192 A1 | 2/2024 | Bernardi | |
| 2024/0056525 A1 | 2/2024 | DeLuca | |
| 2024/0073696 A1 | 2/2024 | Singh | |
| 2024/0086384 A1 | 3/2024 | Soon-Shiong et al. | |
| 2024/0095733 A1 | 3/2024 | Gauvreau, Jr. | |
| 2024/0146523 A1 | 5/2024 | DeLuca et al. | |
| 2024/0185191 A1 | 6/2024 | Bernardi | |
| 2024/0202703 A1 | 6/2024 | Brogliato et al. | |
| 2024/0242287 A1 | 7/2024 | Rice | |
| 2024/0243977 A1 | 7/2024 | Orsi et al. | |
| 2024/0346473 A1 | 10/2024 | Agbamu | |
| 2024/0370865 A1 | 11/2024 | Bernardi | |
| 2024/0428306 A1 | 12/2024 | Sliwka et al. | |
| 2025/0007741 A1 | 1/2025 | Chapman et al. | |

(56)                    References Cited

U.S. PATENT DOCUMENTS

| | | | |
|---|---|---|---|
| 2025/0021949 A1* | 1/2025 | Makeig | ............ G06Q 20/38215 |
| 2025/0029077 A1 | 1/2025 | Dominique et al. | |
| 2025/0168011 A1 | 5/2025 | DeLuca et al. | |
| 2025/0254143 A1 | 8/2025 | Pezeshki et al. | |
| 2025/0274481 A1 | 8/2025 | DeLuca et al. | |
| 2025/0299188 A1 | 9/2025 | DeLuca et al. | |
| 2026/0004345 A1 | 1/2026 | DeLuca | |

FOREIGN PATENT DOCUMENTS

| | | |
|---|---|---|
| WO | 2020/010023 A1 | 1/2020 |
| WO | 2022/087420 A1 | 4/2022 |
| WO | 2024/207123 A1 | 10/2024 |

OTHER PUBLICATIONS

Jake Frankenfield, "Merkle Root (Cryptocurrency)", https://www.investopedia.com/terms/m/merkle-root-cryptocurrency.asp#:~:text=A%20Merkle%20root%20is%20a,whole%2C%20undamaged%2C%20and%20unaltered, Investopedia, Aug. 24, 2021, 7 pages.

"Merkle Tree & Merkle Root Explained", Nov. 29, 2017, https://www.mycryptopedia.com/merkle-tree-merkle-root-explained/, 3 pages.

"Calculating the Merkle Root for a block", https://bitcoindev.network/calculating-the-merkle-root-for-a-block/, downloaded from the internet on Jun. 24, 2022, 15 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

"What is a non-fungible token (NFT)?", https://www.coinbase.com/learn/crypto-basics/plp-what-is-nft, downloaded from the internet on Mar. 25, 2022, 10 pages.

"Why Are Some Domains Protected?", Unstoppable Domains, Mar. 11, 2022, https://support.unstoppabledomains.com/support/solutions/articles/48001186091-why-are-some-domains-protected, 3 pages.

"Humanity Check Overview", https://docs.unstoppabledomains.com/login-with-unstoppable/humanity-check/humanity-check-for-login/, downloaded from the internet on Apr. 7, 2022, 5 pages.

Chris Hexton, "What is a webhook: How they work and how to set them up", https://www.getvero.com/resources/webhooks/, downloaded from the internet on May 12, 2022, 18 pages.

"Blocks", https://ethereum.org/en/developers/docs/blocks/#block-anatomy, Jan. 3, 2022, 6 pages.

"Ethereum Name Service (ENS)", https://www.coingecko.com/en/coins/ethereum-name-service, retrieved from the Internet Oct. 30, 2023, 11 pages.

"Decentralised naming for wallets, websites, & more", https://ens.domains/, retrieved from the Internet Oct. 30, 2023, 8 pages.

Chiliveri, Sireesha, et al., "ProveDoc: A Blockchain based Proof of Existence with Proof of Storage", 2019 International Conference on Information Technology (ICIT), IEEE, 2019, 6 pages.

Samaneh Tajalizadehkhoob, "New ICANN Project Explores the Drivers of Malicious Domain Name Registrations", ICANN Blogs, https://www.icann.org/en/blogs/details/new-icann-project-explores-the-drivers-of-malicious-domain-name-registrations-25-04-2023-en, Apr. 25, 2023, 3 pages.

"Alchemy API Reference Overview", downloaded from the internet on Feb. 28, 2024, https://docs.alchemy.com/reference/api-overview, 8 pages.

"Ethereum Gas Tracker", downloaded from the internet on Feb. 28, 2024, 4 pages.

International Search Report and Written Opinion in corresponding International Application No. PCT/US23/66535, mailed Sep. 29, 2023, 8 pages.

International Search Report and Written Opinion in International Application No. PCT/US23/65610, dated Jul. 31, 2023, 9 pages.

Jason Nelson, "Rug Pulls Force Solana NFT Marketplace Magic Eden to Invoke Doxing Policy for Creators", Decrypt, Feb. 21, 2022, https://decrypt.co/93474/rug-pulls-solana-nft-marketplace-magic-eden-doxing-policy-launchpad, 8 pages.

James Beck, Blog, "Mirror.xyz Review: How To Use MetaMask To Compete In The $WRITE Race", Jul. 30, 2021, https://consensys.net/blog/metamask/mirror-xyz-review-how-to-use-metamask-to-compete-in-the-write-race, 14 pages.

Edward Jones, "How to Deplpoy NFT Smart Contracts", Better Programming, Dec. 2, 2021, https://betterprogramming.pub/how-to-deploy-nft-smart-contracts-9271ce5e91c0, 20 pages.

"Unstoppable Domains launches Login with Unstoppable", https://unstoppabledomains.com/blog/introducing-login-with-unstoppable, Jan. 9, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

"Allowlists, denylists, and approved senders", Google Workspace Admin Help, https://support.google.com/a/answer/60752?hl=en#:~:text=Email allowlist—A list of, allowlist the contact's IP address 1, downloaded from the internet on Oct. 31, 2022, 1 page.

"S/MIME Digital Signatures", GlobalCerts, https://globalcerts.com/smime-digital-signatures, downloaded from the internet on Oct. 31, 2022, 5 pages.

"Verify your site ownership—Search Console Help", https://support.google.com/webmasters/answer/9008080?hl=en#zippy=%2Chtml-file-upload, downloaded from the internet on Mar. 25, 2022, 5 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Twitter verification requirements—how to get the blue check", https://help.twitter.com/en/managing-your-account/about-twitter-verified-accounts, downloaded from the internet on Mar. 25, 2022, 19 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

International Search Report and Written Opinion in International Application No. PCT/US23/68858, dated Oct. 19, 2023, 8 pages.

(56)        References Cited

OTHER PUBLICATIONS

"DNS records for unstoppabledomains.com", Unstoppable Domains, https://www.nslookup.io/domains/unstoppabledomains.com/dns-records/, downloaded from the internet on Nov. 16, 2023, 5 pages.
International Search Report and Written Opinion in International Application No. PCT/US23/71399, dated Nov. 16, 2023, 10 pages.
Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.
"Claim your DNS name onchain in ENS", ENS, https://support.ens.domains/en/articles/7882690-claim-your-dns-name, downloaded from the internet on Feb. 9, 2024, 10 pages.
"Ethereum Name Service (ENS)", https://etherscan.io/token/0xc18360217d8f7ab5e7c516566761ea12ce7f9d72#readContract, downloaded from the internet on Feb. 9, 2024, 4 pages.
"Ethereum Name Service (ENS)", https://etherscan.io/token/0xc18360217d8f7ab5e7c516566761ea12ce7f9d72#writeContract, downloaded from the internet on Feb. 9, 2024, 2 pages.
"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.
"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.
"Introducing Blend: the Peer-to-Peer Perpetual Lending Protocol for NFT's", https://x.com/blur_io/status/1653051809240604674?s=20, downloaded from the internet Jun. 26, 2024, 2 pages.
Owen Fernau, "Blur Launches NFT Lending Protocol", The Defiant, https://thedefiant.io/news/nfts-and-web3/blur-nft-lending, May 2, 2023, 7 pages.
"NFTs and Real-World Assets: A match made in heaven", Brú Finance, Mar. 14, 2024, https://medium.com/bru-finance/nfts-and-real-world-assets-a-match-made-in-heaven-6deb5365a343, 9 pages.
data.iana.org/TLD/tlds-alpha-by-domain.txt, Aug. 30, 2024, 23 pages.
Wikipedia, "List of Internet top-level domains", https://en.wikipedia.org/wiki/List_of_Internet_top-level_domains, Aug. 30, 2024, 67 pages.
Mitchell Anicas, "An Introduction to OAuth 2", DigitalOcean, https://www.digitalocean.com/community/tutorials/an-introduction-to-oauth-2, Jul. 21, 2014, 14 pages.
"DNS Records Explained—Domain Name System Management", Domain.com, https://www.domain.com/help/article/dns-management-dns-records-explained, downloaded from the internet on Mar. 25, 2022, 5 pages.

* cited by examiner

ACQUISITION OF DIGITAL ASSETS ON A BLOCKCHAIN USING OFF-CHAIN VALUATION AND AUTHORIZATION

TECHNICAL FIELD

Present invention embodiments relate to blockchains, and more specifically, to acquiring digital assets on a blockchain (e.g., non-fungible token (NFT) domain names, etc.) based on valuation of the digital asset and authorization performed off-chain.

BACKGROUND

Discussion of the Related Art

Acquiring digital assets directly from blockchain smart contract functions (or on-chain) enables users and organizations to secure digital assets without calling third party application programming interfaces (APIs) or visiting online marketplaces or e-commerce sites. A challenge for on-chain acquisition is the dynamic nature of pricing and permission or authorization logic, and the role they perform with respect to acquiring the digital asset and ultimately finalizing a transaction.

In order to allow on-chain purchases and the corresponding transparency, complex logic for business needs is required when issuing an on-chain digital asset. For example, the complex logic may include pricing logic or validation logic to ensure a qualified customer. However, supporting the complex logic on-chain is difficult, especially when new special pricing and availability rules are implemented for different digital assets, different partners, buyers, users, and resellers.

SUMMARY

According to one embodiment of the present invention, a system for acquiring a digital asset on a blockchain comprises one or more memories and at least one processor coupled to the one or more memories. The system receives transaction information for a transaction to acquire the digital asset on the blockchain. The transaction information including a value for acquiring the digital asset is verified based on authentication information. Off-chain processing determines a dynamically changing value for acquiring the digital asset and produces the authentication information based on the dynamically changing value. The transaction is performed on the blockchain to acquire the digital asset in response to verification of the transaction information. Embodiments of the present invention further include a method and computer program product for acquiring a digital asset on a blockchain in substantially the same manner described above.

BRIEF DESCRIPTION OF THE DRAWINGS

Generally, like reference numerals in the various figures are utilized to designate like components.

DETAILED DESCRIPTION

Figure 1:
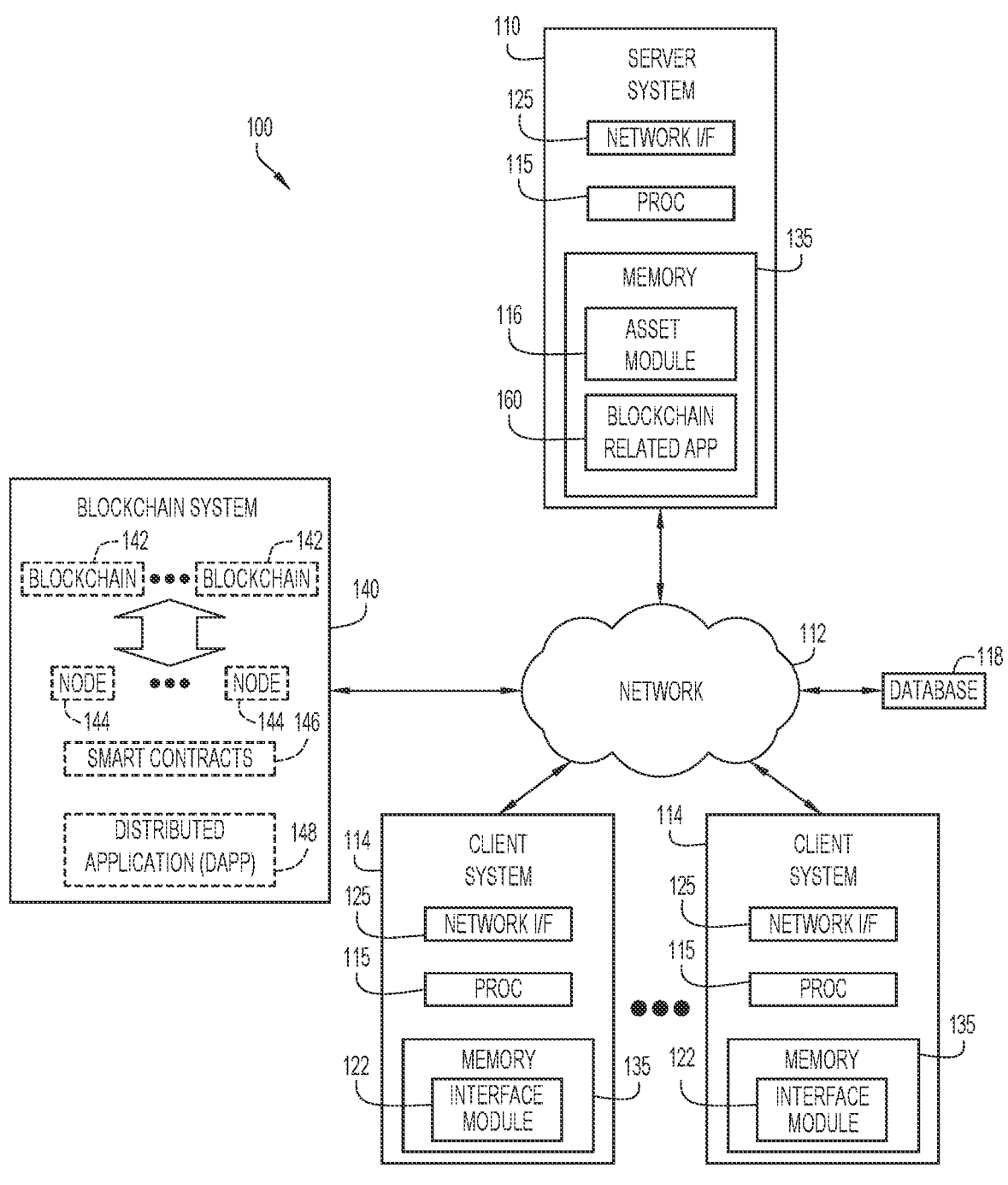
FIG. 1 is a diagrammatic illustration of an example computing environment according to an embodiment of the present invention.

Acquiring digital assets directly from blockchain smart contract functions (or on-chain) enables users and organizations to secure digital assets without calling third party application programming interfaces (APIs) or visiting online marketplaces or e-commerce sites. A challenge for on-chain acquisition is the dynamic nature of pricing and permission or authorization logic, and the role they perform with respect to acquiring the digital asset and ultimately finalizing a transaction.

In order to allow on-chain purchases and the corresponding transparency, complex logic for business needs is required when issuing an on-chain digital asset. For example, the complex logic may include pricing logic or validation logic to ensure a qualified customer. However, supporting the complex logic on-chain is difficult, especially when new special pricing and availability rules are implemented for different domain names and different partners and resellers.

Accordingly, an embodiment of the present invention enables acquisition of digital assets on a blockchain using off-chain logic to validate an on-chain issuance. Acquisition of a digital asset may include any operation or action that provides ownership or rights to the digital asset (e.g., initial ownership or rights, transfer of ownership or rights, sharing of ownership or rights, etc.). A digital asset may include any blockchain entity that is associated with, and/or may be acquired or owned by, a corresponding user (e.g., non-fungible token (NFT), a fungible token, a non-fungible token (NFT) domain name, a set of blockchain records, etc.). The complex logic for business needs (e.g., pricing logic, validation logic, etc.) is moved off-chain to reduce costs and increase flexibility for implementing business logic for on-chain smart contracts. A smart contract can be designed to operate with this off-chain logic by having entities (e.g., users, applications, devices, etc.) obtain data processed off-chain and provide the data to the smart contract for contract interaction.

Embodiments of the present invention provide several advantages. For example, present invention embodiments provide cheaper gas (e.g., reduce fees for conducting a transaction or executing a contract on a blockchain based on reduced computational resources and processing, etc.) since processing is off-loaded from the blockchain. In other words, the off-chain processing reduces computational resources needed by the blockchain to enhance computing performance and reduce response time, and expands its capabilities to handle complex scenarios for acquisition of digital assets. Further, significantly more complex logic may be employed for control of distribution of on-chain digital assets (e.g., more complex pricing and provisioning rules of on-chain assets, etc.). This may achieve a greater level of access control (or security) for the digital assets, revenue, or other objectives from more complex logic. In addition, an owner of a digital asset can reinforce strict permissions or authorization to ensure only authorized entities are able to acquire on-chain digital assets. By way of example, a purchaser may be required to have requisite credentials (e.g., know your customer (KYC) validation, off-chain membership, etc.) in order to purchase the on-chain asset. This provides enhanced security for acquiring or accessing the on-chain digital assets.

An example environment 100 for use with present invention embodiments is illustrated in FIG. 1. Specifically, environment 100 includes one or more server systems 110, one or more client or end-user systems 114, and one or more blockchain systems 140 each implementing and maintaining at least one corresponding blockchain 142. Server systems 110, client systems 114, and/or blockchain systems 140 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and/or blockchain systems 140 may be local to each other, and communicate via any appropriate local communication medium (e.g., local area network (LAN), hardwire, wireless link, Intranet, etc.).

Server systems 110 include an asset module 116 that interfaces with a user via client system 114 to provide information for acquiring a digital asset on a blockchain (e.g., price, signature, expiration time, etc.). A digital asset may include any blockchain entity that is associated with, and/or may be acquired or owned by, a corresponding user (e.g., non-fungible token (NFT), a fungible token, a non-fungible token (NFT) domain name, a set of blockchain records, etc.). Asset module 116 may be implemented by any application or application programming interface (API).

Client systems 114 may include an interface module 122 to provide a graphical user (e.g., GUI, etc.) or other interface (e.g., command line prompts, menu screens, etc.) that enables users to access server systems 110 for acquiring digital assets on a blockchain. The interface module may include any conventional or other browser to access server systems 110.

Blockchain systems 140 may each include one or more nodes 144 to implement and maintain at least one corresponding blockchain 142. The nodes may be implemented by any suitable computing devices (e.g., as described below for FIG. 2). The blockchain is generally in the form of a ledger that includes a series of records or blocks chained or linked together. The blockchain is typically managed by a peer-to-peer network (of nodes 144) and used as a distributed ledger. Nodes 144 of the peer-to-peer network communicate and verify new blocks according to a protocol. The peer-to-peer network provides a decentralized approach, where each node has a copy of a blockchain 142. Transactions are transmitted to the peer-to-peer network, where mining nodes (nodes 144) process the transactions. The mining nodes validate a transaction, insert the transaction into a current block, and transmit the block to the other nodes. Blockchain 142 may be implemented by any conventional or other blockchain, and may be a public (e.g., no access restrictions, etc.), private (e.g., restricted access, etc.), or hybrid (e.g., with centralized and decentralized features) blockchain.

Blockchain systems 140 may include one or more distributed or decentralized applications (dApps) 148 to perform various operations (e.g., financial or other transactions related to a blockchain, etc.). In addition, a blockchain 142 may store software (e.g., typically referred to as smart contracts 146) that executes in response to occurrence of pre-defined conditions. A smart contract is generally software or a program that runs on the blockchain.

Interface module 122 of client systems 114 may further provide a graphical user (e.g., GUI, etc.) or other interface (e.g., command line prompts, menu screens, etc.) that enables users to access distributed applications (dApps) 148 on blockchain systems 140 for performing various operations (e.g., financial or other transactions related to a blockchain, etc.). The interface module may include any conventional or other browser to access the distributed applications (dApps) of blockchain systems 140. The interface module may natively, or include extensions to, access the distributed applications (dApps). The interface module may provide a user interface to serve as a front end for a distributed application (dApp) 148, where back end processing for the distributed application (dApp) is performed on a blockchain system 140. Client systems 114 may further provide reports or notifications pertaining to requests from users (e.g., results of acquiring a digital asset on a blockchain, results of verifications, etc.).

Server systems 110 may further include one or more blockchain related applications 160 for performing various operations (e.g., financial or other transactions related to a blockchain, acquisition of a digital asset on a blockchain, wallet transactions, etc.). Asset module 116 and blockchain related applications 160 may be on the same or different server systems 110. In this case, interface module 122 may further provide a graphical user (e.g., GUI, etc.) or other interface (e.g., command line prompts, menu screens, etc.) that enables users to access blockchain related applications 160 on server systems 110 for performing the various operations (e.g., financial or other transactions related to a blockchain, acquisition of a digital asset on the blockchain, wallet transactions, etc.). The interface module may include any conventional or other browser to access server systems 110.

A database system 118 may store various information for digital asset acquisition (e.g., mappings of blockchain identities to blockchains, metadata, pricing information, etc.). The database system may be implemented by any conventional or other database or storage unit, may be local to or remote from server systems 110, client systems 114, and/or blockchain systems 140, and may communicate via any appropriate communication medium (e.g., local area network (LAN), wide area network (WAN), Internet, hardwire, wireless link, Intranet, etc.).

Server systems 110 and client systems 114 may be implemented by any conventional or other computer systems preferably equipped with a display or monitor, a base, optional input devices (e.g., a keyboard, mouse or other input device), and any software for use by present invention embodiments (e.g., server/communications software, blockchain software, asset module 116, interface module 122, blockchain related applications 160, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Asset module 116, interface module 122, 146, distributed applications (dApps) 148, and blockchain related applications 160 may include one or more modules or units to perform the various functions of present invention embodiments described below. The various modules (e.g., asset module 116, interface module 122, blockchain related applications 160, etc.) may be implemented by any combination of any quantity of software and/or hardware modules or units, and may reside within memory 135 of the server and/or client systems for execution by a corresponding processor 115. The various modules of the blockchain (e.g., smart contracts 146, distributed applications (dApps) 148, etc.) may be implemented by any combination of any quantity of software and/or hardware modules or units, and may reside on a blockchain 142 for execution by one or more nodes 144.

Figure 2:
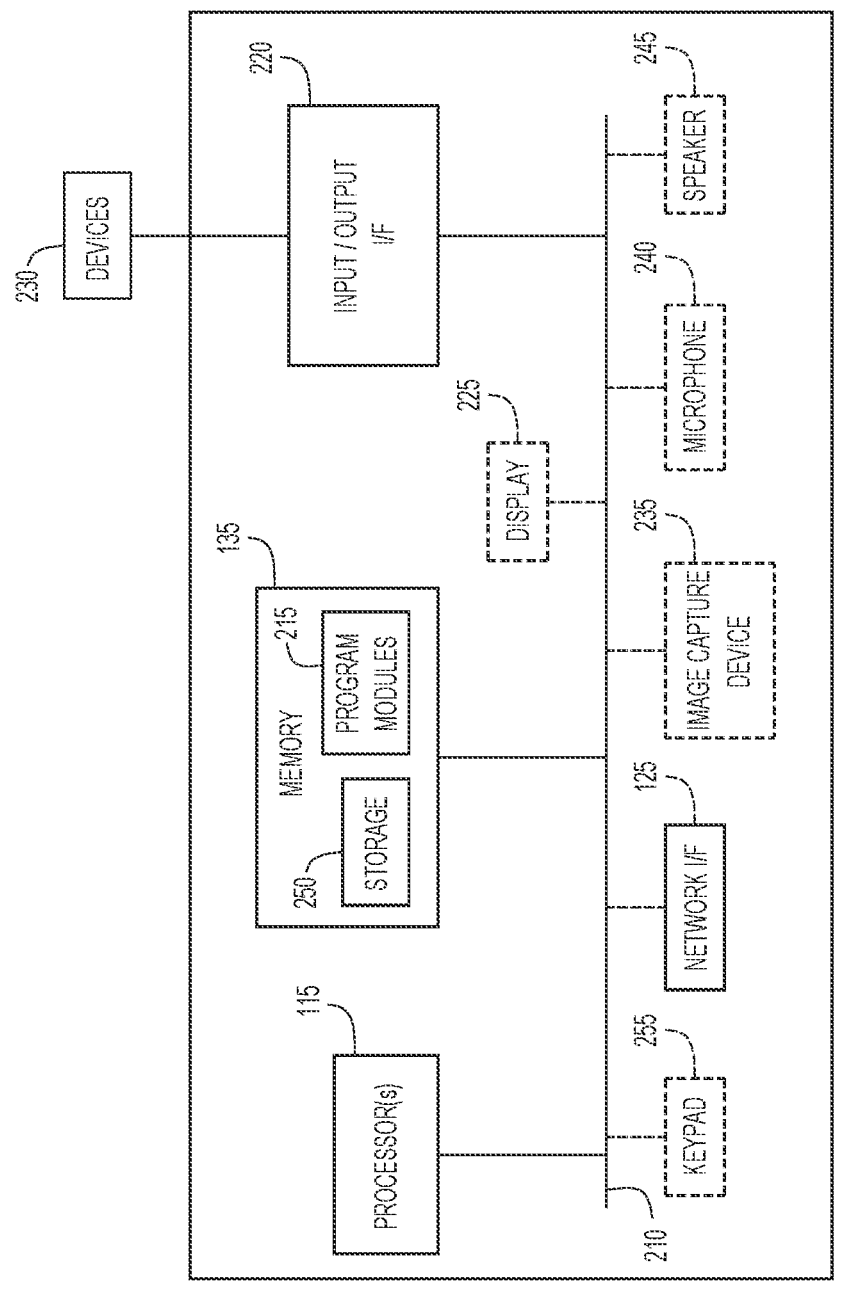
FIG. 2 is a block diagram of an example computing device according to an embodiment of the present invention.

An example of a computing device 200 for environment 100 (e.g., implementing server systems 110, client systems 114, blockchain systems 140, nodes 144, etc.) is illustrated in FIG. 2. The example computing device may perform the functions of present invention embodiments described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to asset module 116, interface module 122, blockchain software (e.g., smart contracts 146, distributed applications (dApp) 148, blockchain management software, etc.), blockchain related applications 160, network site or service software, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or other image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, a blockchain (e.g., blockchain 142, etc.) is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract (e.g., smart contracts 146) is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and decentralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
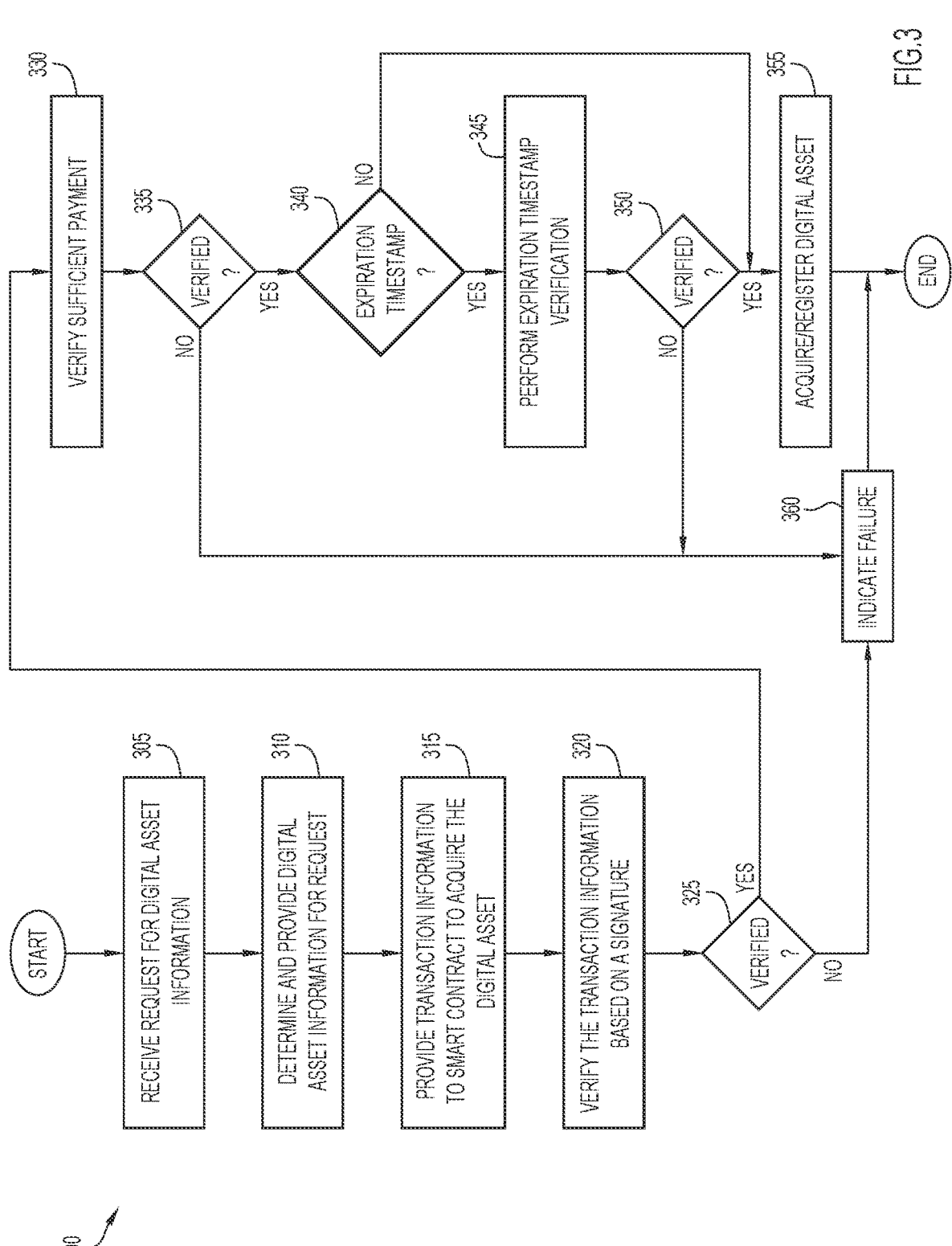
FIG. 3 is a flowchart of a method of acquiring a digital asset on a blockchain according to an embodiment of the present invention.

A method 300 of acquiring a digital asset on a blockchain (e.g., via asset module 116, smart contracts 146, blockchain related applications 160, server system 110, client system 114, and/or blockchain system 140) according to an embodiment of the present invention is illustrated in FIG. 3. Initially, an entity (e.g., user, application, device, etc.) accesses asset module 116 to request information for a digital asset on a blockchain 142 of a blockchain system 140. For example, a user may access asset module 116 via a client system 114 to request information for a digital asset. Further, an application or device (e.g., residing on, or in communication with, server systems 110) may access asset module 116 to request information for a digital asset (desired by a user). The request includes the digital asset to be acquired (e.g., non-fungible token (NFT) domain name, etc.), and may further include an owner (e.g., indicated by a wallet address, non-fungible token (NFT) domain name or other asset that may resolve to a wallet address based on information retrieved from a blockchain, etc.).

Asset module 116 receives the request at operation 305 and determines and provides the digital asset information at operation 310. The digital asset information may include a value or price (e.g., including no value or free) for the digital asset (e.g., a non-fungible token (NFT) domain name, etc.), owner (e.g., wallet address, non-fungible token (NFT) domain name or other asset resolvable to a wallet address, etc.), the digital asset (e.g., non-fungible token (NFT) domain name, etc.), authentication information, an identifier of the digital asset (e.g., alphanumeric or other indicator, etc.), and smart contract functions or transactions for acquiring the digital asset. In addition, the information may further include an expiration timestamp indicating a time interval for which the value for the digital asset remains valid. The authentication information may include any information validating the digital asset information (e.g., signature, Merkle proof, etc.). For example, the authentication information may include a signature wrapping or encoding the value, owner (e.g., wallet address, non-fungible token (NFT) domain name or other asset resolvable to a wallet address, etc.), the digital asset (e.g., non-fungible token (NFT) domain name, etc.), and an identifier of the digital asset (e.g., alphanumeric or other indicator, etc.). The signature may also wrap or encode the expiration timestamp when employed. The signature for the authentication information may be determined by encrypting the information (e.g., value, owner, digital asset, digital asset identifier, expiration timestamp, etc.) using any conventional or other encoding techniques (e.g., hashing, encryption, etc.).

The price or value of a digital asset may dynamically change over time according to various conditions. The expiration timestamp provides a time interval for which a determined value or price remains valid. When acquisition of the digital asset for a determined value or price occurs after the expiration timestamp, the transaction may be denied and a new price or value (and authentication information) need to be obtained to acquire the digital asset. By way of example, asset module 116 may determine values of digital assets (e.g., non-fungible token (NFT) domain names, etc.) based on tiers. The tiers have a combination of character length, dictionary word(s), and other logic to determine a value. However, the value may be determined via any conventional or other techniques and based on any attributes (e.g., demand, value of similar digital assets, value history, etc.). Similarly, the expiration time interval may vary, and be determined via any conventional or other techniques and based on any attributes (e.g., demand, value changes of similar digital assets, value change history, etc.).

The entity (e.g., user, application, device, etc.) accesses a blockchain related application 160 to acquire the digital asset on the blockchain (e.g., register a non-fungible token (NFT) domain name or other digital asset, etc.). For example, the user may access a blockchain related application 160 via a client system 114 to acquire the digital asset. Further, an application or device (e.g., residing on, or in communication with, server systems 110) may access a blockchain related application 160 to acquire the digital asset. The blockchain related application may include a tool (e.g., a blockchain explorer that accesses data on a blockchain, etc.) to access and execute functions of a smart contract 146 of the blockchain. The entity provides transaction information to the smart contract (via blockchain related application 160) to acquire the digital asset at operation 315. The transaction information may include information for the digital asset from asset module 116 (e.g., value, owner, digital asset, digital asset identifier, expiration timestamp, authentication information or signature, etc.) and payment information (e.g., an amount and/or type of payment or funds, etc.)

Figure 5:
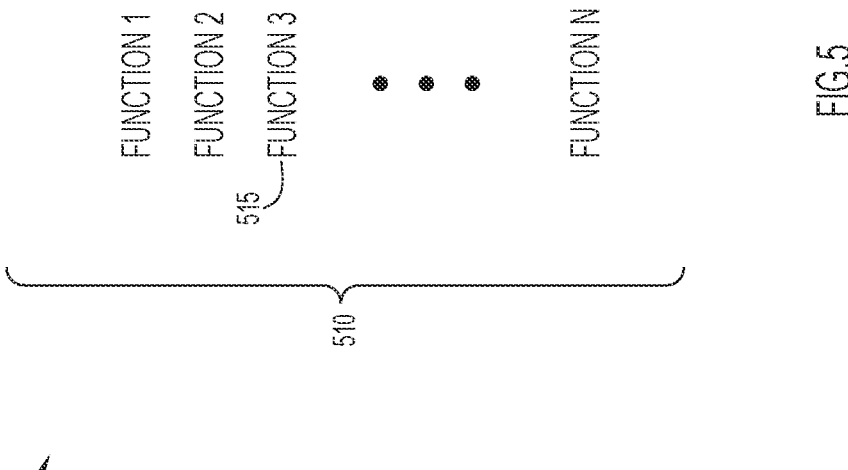
FIG. 5 is a schematic illustration of an example graphical user interface for accessing smart contract functions according to an embodiment of the present invention.
Figure 6:
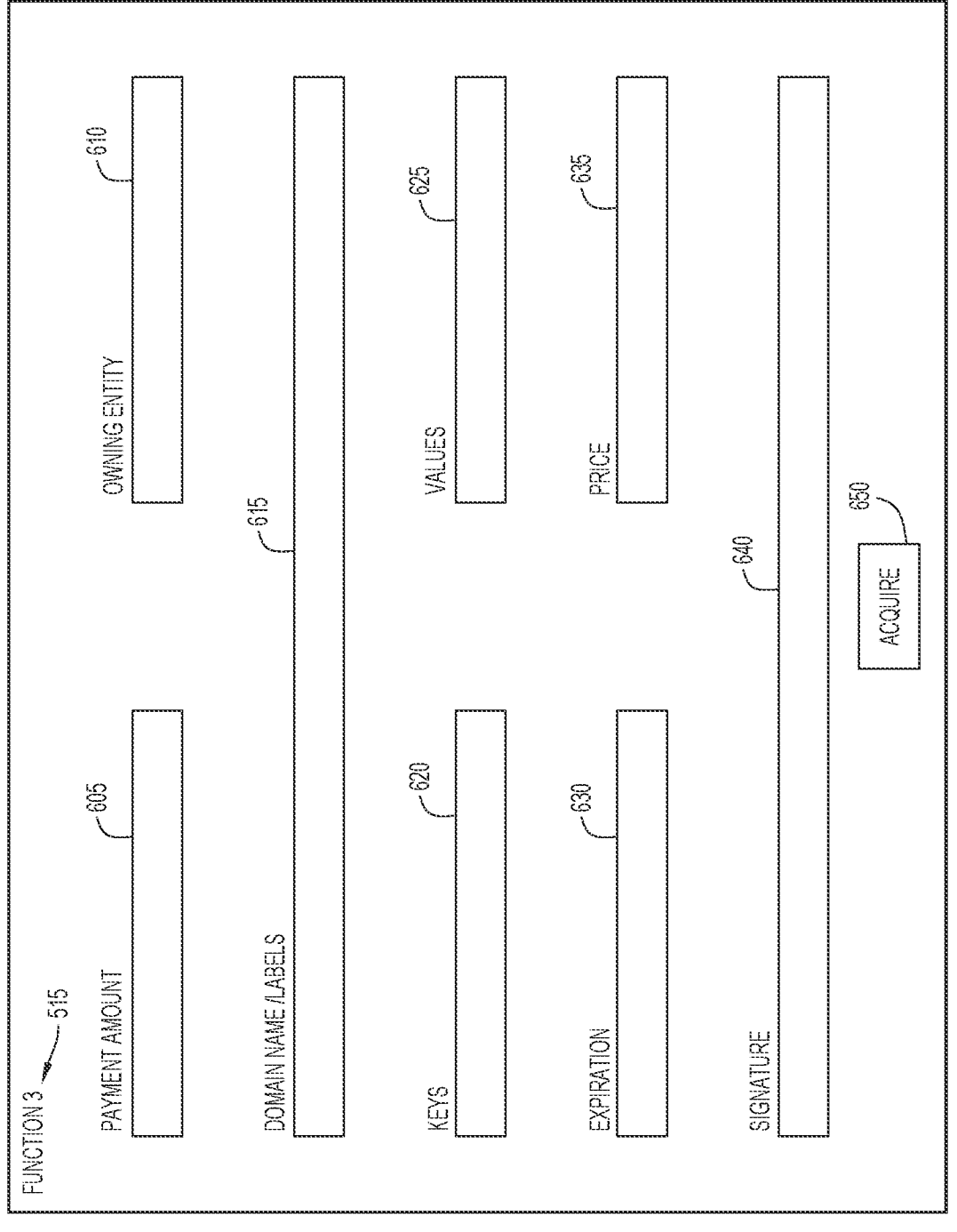
FIG. 6 is a schematic illustration of an example graphical user interface for a smart contract function for acquiring a digital asset on a blockchain according to an embodiment of the present invention.

For example, the user may select an appropriate function of smart contract 146 from a user interface of blockchain related application 160 (FIG. 5), and provide the transaction information on a user interface for the selected smart contract function (FIG. 6). The function of smart contract 146 selected may be based on the function indicated by asset module 116. The transaction information may include one or more attributes from the digital asset information from asset module 116 (e.g., value, owner, digital asset, digital asset identifier, expiration timestamp, authentication information or signature, etc.) and payment information. The attributes may include the digital asset, the digital asset identifier (e.g., an alphanumeric sequence (e.g., 10356) etc.), the authentication information (or signature), and any additional data that may be needed by the smart contract to complete issuance of the digital asset (e.g., value or price, owner to register the digital asset (e.g., NFT domain, etc.) which may be represented by a wallet address or other identifier, expiration timestamp, etc.). The payment information may include an amount and/or type of cryptocurrency or other form of payment. Further, the application or device (e.g., residing on, or in communication with, server systems 110) may provide the attributes and payment information.

Smart contract 146 of blockchain system 140 verifies the transaction information (e.g., including the attributes of the digital asset information) based on the authentication information or signature at operation 320. By way of example, smart contract 146 performs a comparison of the signature with the attributes provided to the smart contract function to verify the digital asset information. The smart contract may recreate the signature based on the provided attributes and encoding technique (e.g., hash, encryption, etc.) used by asset module 116 to initially produce the signature. The smart contract compares the recreated signature with the signature in the received digital asset information. The matching of the signatures verifies that digital asset information provided to the smart contract (e.g., including the price, expiration timestamp, and/or other attributes) matches the digital asset information determined by asset module 116. In other words, when the provided digital asset information (e.g., price, expiration timestamp, etc.) varies from the corresponding digital asset information determined by asset module 116, the recreated signature produced by the smart contract varies from the signature determined by asset module 116 (based on the different information).

The verification verifies that the transaction information provided to the smart contract is valid. The transaction information may include the value or price of the digital asset and/or other data processed off-chain and verified by the authentication information. The verification further enables recovery of the initial signer address of the data (e.g., domain identifier, value, expiration, etc.), and verification that the entity (e.g., user, application, device, etc.) has appropriate rights to acquire or register the digital asset. For example, the smart contract may check the owner or wallet address against various criteria or credentials (e.g., know your customer (KYC) validation, off-chain membership, public or private access, etc.) to determine the owner has rights to acquire or purchase the digital asset. When the owner does not have rights, verification fails.

When the transaction information is verified at operation 325, the verified price is used to verify that the funds provided in the payment information satisfy or match the price or value (determined by asset module 116) at operation 330. When payment is insufficient as determined at operation 335, verification fails.

When the transaction and payment information are verified at operations 325, 335 and an expiration timestamp has been provided as determined at operation 340, smart contract 146 performs an expiration timestamp verification at operation 345. The expiration timestamp may be required in case the value or price of the digital asset has changed (since the initial call to asset module 116). The verification may check satisfaction of one or more conditions associated with the expiration timestamp. For example, new authentication information may be required after expiration of a time interval (e.g., a day or 24 hours, etc.). In other words, when the acquisition is performed after expiration of the time interval, the verification may fail and new authentication information is needed to acquire the digital asset.

Further, a prior price or value may still be used after a new value and authentication information are provided. For example, a previous value or price may be honored (in place of a new value or price) when the previous value or price was lower, or when a difference between the new value or price and the previous value or price is less than a threshold (e.g., five dollars or less, etc.). The expiration timestamp basically controls expiration of permissions and business logic on-chain from data processed off-chain.

When the transaction and payment information are verified (without a requirement for an expiration timestamp) as determined at operations 325, 335, or when an expiration timestamp is required and verified as determined at operations 340, 350, smart contract 146 acquires the digital asset (e.g., non-fungible token (NFT) domain name, etc.) at operation 355. For example, the smart contract performs a transaction on the blockchain to register the NFT domain name (or other digital asset) to the owner indicated in the verified transaction information. The user may be requested to sign the transaction to verify the identity of the user or owner, and authorize payment from a corresponding wallet. The owner may be the user initiating the smart contract function, or the user may be acquiring the digital asset for another user (e.g., person, organization, etc.).

When a verification fails as determined at operations 325 (pertaining to transaction information), 335 (pertaining to payment information), or 350 (pertaining to the expiration timestamp), smart contract 146 indicates a failure and a reason code at operation 360. The reason code may indicate a reason for the failure (e.g., invalid transaction information, lack of rights to perform the acquisition, insufficient payment, expiration of, and/or failure to satisfy conditions associated with, the expiration timestamp, etc.).

Figure 4:
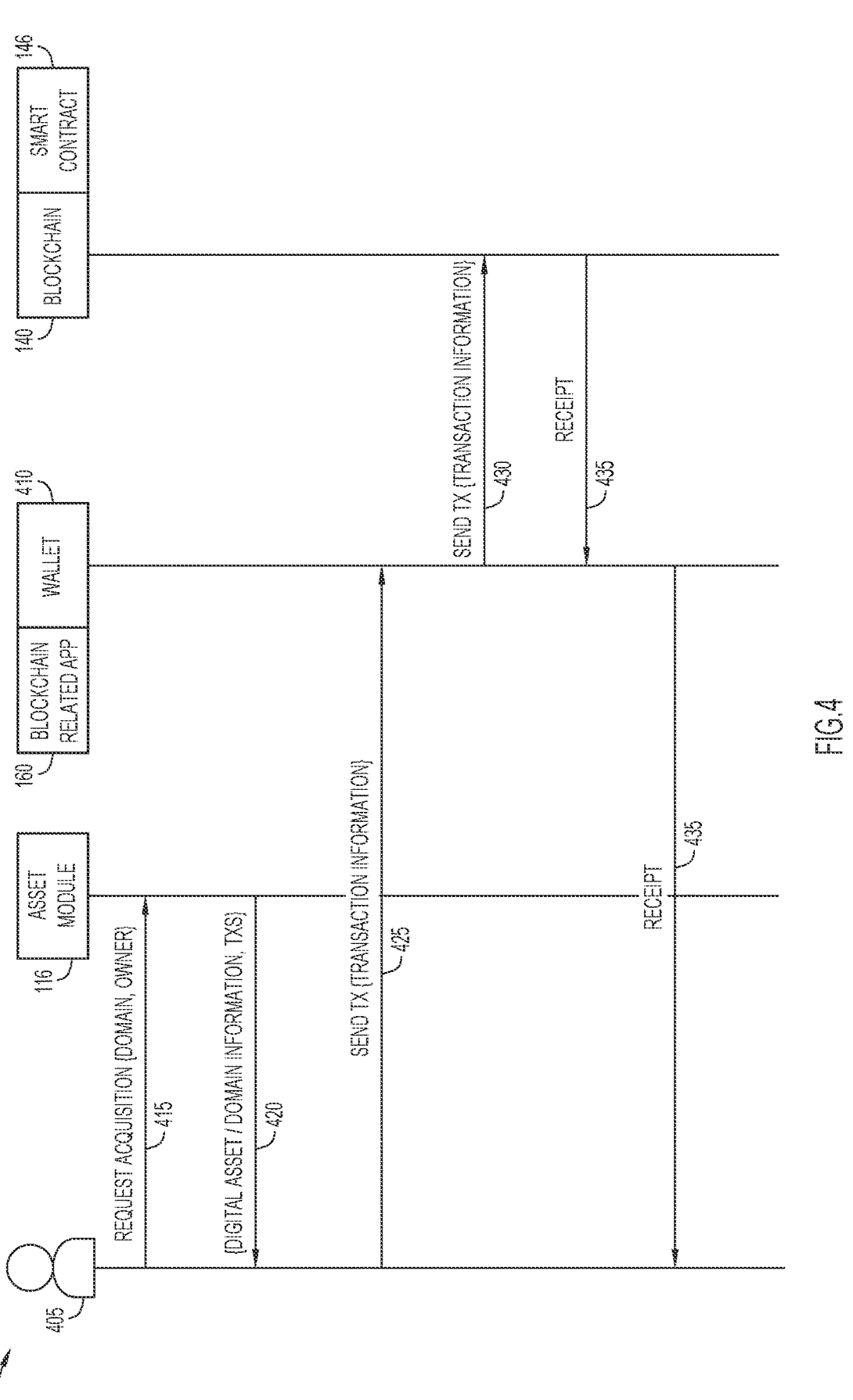
FIG. 4 is flow diagram of a method of acquiring a digital asset on a blockchain using off-chain logic according to an embodiment of the present invention.

A method 400 of acquiring a digital asset on a blockchain using off-chain logic (e.g., via asset module 116, smart contracts 146, blockchain related application 160, server system 110, client system 114, and/or blockchain system 140) according to an embodiment of the present invention is illustrated in FIG. 4. By way of example, a user 405 accesses asset module 116 via a client system 114 to request information for a digital asset on a blockchain 142 of blockchain system 140. The user provides a request to request information for a blockchain domain name (or other on-chain digital asset) at operation 415. The request includes the blockchain domain name to be reserved, and may further include an owner (e.g., indicated by a blockchain (non-fungible token (NFT)) domain name or other asset resolvable to a wallet address, a wallet address, etc.) to own the blockchain domain name. Asset module 116 returns a payload at operation 420 including digital asset or domain information required for user 405 to call a smart contract 146 directly. This information may include a value or price, the owner (e.g., wallet address, NFT domain name, etc.), the blockchain domain name, an identifier for the blockchain domain name (e.g., alphanumeric or other indicator, etc.), authentication information (e.g., a signature, etc.), a timeout or expiration timestamp, and transactions (for smart contract 146) to acquire the digital asset. The signature may be determined in substantially the same manner described above based on wrapping or encoding the value, the owner (e.g., wallet address, NFT domain name, etc.), the digital asset (e.g., non-fungible token (NFT) domain name, etc.), the identifier of the digital asset (e.g., alphanumeric or other indicator, etc.), and the expiration timestamp.

User 405 calls a function of a smart contract 146 (indicated by asset module 116) at operation 425 (via blockchain related application 160 (e.g., a blockchain explorer, etc.)) to acquire the digital asset, and provides transaction information that may include the information (e.g., value or price, owner, blockchain domain name, identifier for the blockchain domain name, authentication information (or signature), timeout or expiration timestamp, etc.) returned from asset module 116 (at operation 420) and payment information (e.g., an amount and/or type of payment or funds, etc.).

Smart contract 146 initially verifies the transaction and payment information in substantially the same manner described above, and returns an error when the transaction information is invalid or the payment does not satisfy or match the value or price. The payment may be empty or zero when there is no required payment. Otherwise, the payment may be in the form of cryptocurrency as may be required by the smart contract. User 405 tenders payment for the value or price of the digital asset and any required gas (or fees for conducting the transaction on the blockchain) using their wallet 410.

For example, user 405 may sign the transaction for the smart contract function using their wallet address 410. By way of example, a message may be generated for wallet 410 of the user for the user to sign. This may be accomplished via blockchain related application 160 and/or an add-on or plug-in applied to interface module 122 (e.g., a browser, etc.) of a client system 114. The user logs in or otherwise accesses the wallet (e.g., via a user name and password, etc.) in order to sign the message and verify the user (and transaction). The blockchain related application monitors the wallet for signing of the transaction until a successful signing is detected or a time out has occurred (e.g., a time interval has expired). The time out may be a predetermined time interval sufficient to enable the user to sign the transaction, and preferably in a range from one through five minutes. However, any time interval may be used for the time out.

By way of example, signing of the message in the wallet generates a digital signature of the message (and transaction) based on the private key of the wallet. The digital signature is provided to the smart contract to initiate the transaction on the blockchain. The signed message or digital signature is decrypted for verification (e.g., by the blockchain) based on the public key (e.g., blockchain address, etc.) corresponding to the wallet. Since the private key is unique to the wallet (or user), successful decryption of the message with the corresponding public key verifies the message was signed by the user. A response may be provided indicating a result of the decryption of the signed message and of the performance of the transaction. When the verification fails, the transaction is denied.

Once the payment (or transaction) is verified, ownership of the digital asset is modified accordingly. For example, a transaction is performed on the blockchain to store a record showing ownership of the digital asset by user 405, and a receipt is provided to wallet 410 at operation 435 and to user 405 (via client system 114) at operation 440. The receipt may be a document with information about the transaction.

Alternatively, the request to asset module 116 (at operation 415) may allow user 405 to tender a payment before engaging with smart contract 146. However, the payment is preferably collected as part of the smart contract interaction since there could be a delay between the request (at operation 415) and returning of information (at operation 420) which may allow another user to acquire the same digital asset. Preferably, user 405 acquires or mints the digital asset immediately in order to avoid this timing issue.

Operation of an embodiment of the present invention for an example scenario is described with respect to FIGS. 5-6. Initially, a user desires to register a blockchain domain name, and preferably directly on a smart contract rather than by a third party application or website. The user calls asset module 116 (via client system 114) to determine the cost of the blockchain domain name and other information (e.g., authentication information or signature, an identifier of the digital asset (e.g., alphanumeric or other indicator, etc.), smart contract functions or transactions for acquiring the digital asset, an expiration timestamp, etc.) in substantially the same manner described above. The signature from the asset module is saved and later provided to a smart contract function to acquire the blockchain domain name. The signature parameters may include a blockchain domain name, an identifier of the blockchain domain name, an owner (wallet) address, a value or price to acquire the blockchain domain, and a time expiration for performing the acquisition for the value or price.

The user may open a blockchain smart contract tool (e.g., blockchain related application 160 (e.g., a blockchain explorer, etc.)) to deploy and run transactions, or may directly access the smart contract. The user loads the smart contract (which may be publicly available on the Internet or other network), and identifies the function to acquire the blockchain domain name (based on the function indicated by asset module 116). Referring to FIG. 5, a user interface 500 may be displayed showing functions 510 for the smart contract (e.g., FUNCTION 1 to FUNCTION N as viewed in FIG. 5). Functions 510 may include a function 515 (e.g., FUNCTION 3 as viewed in FIG. 5) that may be selected by the user to acquire the blockchain domain name.

Once the smart contract function is selected, a user interface 600 (FIG. 6) may be presented with fields requesting information to perform a transaction to acquire the blockchain domain name. For example, a user interface 600 (FIG. 6) may be presented in response to selection of function 515 (FIG. 5). User interface 600 includes a payment field 605 for a payment amount, an owning entity or owner field 610 for a wallet address, a labels field 615 for domain labels (e.g., blockchain domain name and extensions), a keys field 620 for keys of key/value pairs of metadata, a values field 625 for values of the key/value pairs of the metadata, an expiration field 630 for a time interval for which the price is valid, a price field 635 for a price of the blockchain domain name, a signature field 640 for the signature from asset module 116, and an acquire actuator 650 to initiate the transaction.

The user may enter a wallet address (in owner field 610), domain name (in labels field 615), and data needed for verification of authentication information for the off-chain pricing in the corresponding fields (e.g., domain name in labels field 615, price in price field 635, a signature returned from asset module 116 in signature field 640, etc.). The user actuates acquire actuator 650 to initiate the transaction to acquire the blockchain domain name, and signs the transaction in substantially the same manner described above. When verification of the signed transaction is successful, the transaction is performed and the new domain name is secured and transferred to the wallet entered in user interface 600 (owner field 610).

The off-chain pricing logic (of asset module 116) may include pricing variables, such as discount codes that reflect a price for the digital asset based on a percentage off or a flat rate discount.

An embodiment of the present invention may introduce metadata for application programming interfaces (APIs) related to the smart contract (e.g., indicating the API or application to provide the pricing and other information to complete the transaction for the digital asset acquisition). For example, an embodiment of the present invention may have a reference to a pricing and permission API (e.g., asset module 116) in the metadata stored for an already existing or minted digital asset (e.g., blockchain domain name, non-fungible token (NFT), etc.). This information may be stored on-chain or off-chain, and may be retrieved in order to obtain pricing and other information for acquiring the digital asset in substantially the same manner described above.

It will be appreciated that the embodiments described above and illustrated in the drawings represent only a few of the many ways of implementing embodiments for acquisition of digital assets on a blockchain using off-chain valuation and authorization. In addition, characteristics or features of embodiments of the present invention may be combined in any fashion to provide additional embodiments of the present invention.

The environment of the present invention embodiments may include any number of computer or other processing systems (e.g., client or end-user systems, server systems, blockchain systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including asset module 116, interface module 122, smart contracts 146, distributed applications (dApps) 148, blockchain related applications 160, etc.); etc.). These systems may include any types of monitors and input devices (e.g., keyboard, mouse, voice recognition, etc.) to enter and/or view information.

It is to be understood that the software of the present invention embodiments (e.g., asset module 116, interface module 122, smart contracts 146, distributed applications (dApps) 148, blockchain related applications 160, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, and blockchain systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., asset module 116, interface module 122, smart contracts 146, distributed applications (dApps) 148, blockchain related applications 160, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metadata associated with blockchain entities, mappings of blockchain identities to blockchains, value or pricing information, etc.). The database system may be implemented by any number of any conventional or other databases, data stores or storage structures to store information. The database system may be included within or coupled to the server, client, and/or blockchain systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., receipts, results of acquisition, verification results, name and/or other attributes of a blockchain entity, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., results of an acquisition, verification results, etc.).

The present invention embodiments are not limited to the specific tasks or algorithms described above, but may be utilized for any operations (e.g., transfer, purchase, etc.) associated with any entities on a blockchain (e.g., blockchain domain names, non-fungible tokens (NFT), fungible tokens, set of blockchain records, etc.).

The present invention embodiments may process requests from any entity (e.g., user, application, service, computing or other device, etc.) to acquire a digital asset. A digital asset may include any blockchain entity or asset that is associated with, and/or may be used to identify, a corresponding user (e.g., non-fungible token (NFT), a fungible token, a non-fungible token (NFT) domain name, a set of blockchain records, etc.). The digital asset may correspond to various items (e.g., blockchain or other domain name, digital art, music, video game items, non-fungible tokens (NFTs), fungible tokens, blockchain records, etc.). The digital asset may be indicated by any name or identifier including any quantity of terms, words, tokens, or arrangements of any quantity of any types of elements (e.g., alphanumeric or other characters, symbols, numbers, etc.). The name or identifier preferably includes a name or identifier portion and an optional extension (e.g., "name.el", etc.). Alternatively, the name or identifier may include the name or identifier portion without the extension. The name or identifier portion and extension may each include any quantity of terms, words, tokens, or arrangements of any quantity of any types of elements (e.g., alphanumeric or other characters, symbols, numbers, etc.).

Any quantity of any information may be determined by off-chain processing (e.g., asset module 116) to acquire a digital asset (e.g., valuation, wallet, time expiration, etc.). Off-chain processing may include any processing performed on any computing or other resources external of a blockchain. The off-chain processing may receive any quantity of any information to determine the information (e.g., digital asset information, owner information, etc.). The owner may be indicated by a wallet or other blockchain address, or by any blockchain entity (e.g., non-fungible token (NFT), NFT domain name, fungible token, etc.). The blockchain entity may be resolved to a wallet address based on information retrieved from a blockchain. The user acquiring a digital asset may be verified in any manner (e.g., signing a message, user verification, encryption/decryption, username/password, etc.). Further, any portions of the information may be produced on-chain and/or off-chain.

The value or price may be fixed or dynamically vary, and may be determined via any conventional or other techniques and based on any attributes (e.g., demand, value of similar digital assets, value history, etc.). The expiration timestamp or time interval may be of any format, and indicate any desired point or interval of time (e.g., an end or expiration time, a time interval (e.g., days, hours, minutes, etc.), etc.), The expiration timestamp or time interval may be fixed or may vary, and may be determined via any conventional or other techniques and based on any attributes (e.g., demand, value changes of similar digital assets, value change history, etc.). Any conditions may be associated with the expiration timestamp or time interval to control performance of a transaction (e.g., enable or deny the transaction based on a time of occurrence of the transaction, control a value or price used for the transaction (e.g., current or prior value or price, etc.), etc.).

The authentication information may be produced using any conventional or other encoding techniques (e.g., hash, encryption, etc.), and may encode any quantity of any desired information. The authentication information may be in any form (e.g., signature, Merkle or other proof, etc.).

The transaction information provided to the smart contract to acquire the digital asset may include any quantity of any information (e.g., digital asset information, payment information, etc.). The smart contract may be accessed using any conventional or other tool (e.g., blockchain explorer, etc.). A user may request information from off-chain processing and provide the information to the smart contract to perform the acquisition of the digital asset. Alternatively, the information may be requested and provided automatically (e.g., via an application, device, etc.) to the smart contract to perform the acquisition. Further, a user may acquire a digital asset for themselves or another user (e.g., person, organization, etc.).

The user or owner may be checked against any criteria (e.g., certain users, public or private, membership of communities, etc.) to determine rights of the user to acquire the digital asset. The user verification may be performed by the smart contract or other application (e.g., blockchain related application, distributed application (dApp), etc.).

Having described preferred embodiments of a new and improved system, method, and computer program product for acquisition of digital assets on a blockchain using off-chain valuation and authorization, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of acquiring a digital asset on a blockchain of a blockchain system comprising:

retrieving, by at least one processor of a server system, a reference to an off-chain processing module from metadata of the digital asset on the blockchain, wherein the digital asset includes a non-fungible token;

requesting and receiving from the off-chain processing module based on the reference, by the at least one processor of the server system, transaction information for a transaction that acquires the digital asset on the blockchain, wherein the transaction information includes one or more functions of a smart contract of the blockchain system that acquire the digital asset, a value for acquiring the digital asset that dynamically changes, a digital asset identifier, and authentication information including a signature produced by using an encoding technique that encrypts at least the value and the digital asset identifier;

executing, by the at least one processor of the server system, the one or more functions of the smart contract on the blockchain system with the transaction information for acquiring the digital asset for the value indicated in the transaction information;

generating, by the smart contract of the blockchain system, a new signature by encrypting at least the value and the digital asset identifier within the transaction information using the encoding technique;

verifying, by the smart contract of the blockchain system, the transaction information was produced by the off-chain processing module based on comparing the signature within the authentication information to the new signature; and performing, by the smart contract of the blockchain system, the transaction on the blockchain that acquires the digital asset in response to verification of the transaction information.

2. The method of claim 1, wherein the non-fungible token includes a blockchain domain name.

3. The method of claim 2, wherein performing the transaction comprises:

registering the digital asset on the blockchain.

4. The method of claim 1, wherein verifying the transaction information comprises:

matching the new signature to the signature of the authentication information to verify the transaction information for acquiring the digital asset.

5. The method of claim 4, wherein the transaction information includes an amount of payment, and verifying the transaction information further comprises:

verifying that the amount of payment is sufficient to acquire the digital asset for the value of the verified transaction information.

6. The method of claim 1, wherein the verified transaction information includes a time interval for which the value of the verified transaction information for acquiring the digital asset remains valid, and verifying the transaction information comprises:

verifying the transaction information further based on satisfying one or more conditions associated with the time interval.

7. The method of claim 6, wherein the one or more conditions include acquiring the digital asset for the value of the verified transaction information within the time interval.

8. A system for acquiring a digital asset comprising:

a blockchain system including a blockchain and a smart contract; and a server system including one or more memories and at least one processor coupled to the one or more memories, the at least one processor configured to:

retrieve a reference to an off-chain processing module from metadata of the digital asset on the blockchain, wherein the digital asset includes a non-fungible token;

request and receive, from the off-chain processing module based on the reference, transaction information for a transaction that acquires the digital asset on the blockchain, wherein the transaction information includes one or more functions of the smart contract of the blockchain system that acquire the digital asset, a value for acquiring the digital asset that dynamically changes, a digital asset identifier, and authentication information including a signature produced by using an encoding technique that encrypts at least the value and the digital asset identifier; and execute the one or more functions of the smart contract on the blockchain system with the transaction information for acquiring the digital asset for the value indicated in the transaction information;

wherein executing the one or more functions of the smart contract causes the blockchain system to:

generate a new signature by encrypting at least the value and the digital asset identifier within the transaction information using the encoding technique;

verify the transaction information was produced by the off-chain processing module based on comparing the signature within the authentication information to the new signature; and perform the transaction on the blockchain that acquires the digital asset in response to verification of the transaction information.

9. The system of claim 8, wherein the non-fungible token includes a blockchain domain name.

10. The system of claim 9, wherein performing the transaction comprises:

registering the digital asset on the blockchain.

11. The system of claim 8, wherein verifying the transaction information comprises:

matching the new signature to the signature of the authentication information to verify the transaction information for acquiring the digital asset.

12. The system of claim 11, wherein the transaction information includes an amount of payment, and verifying the transaction information further comprises:

verifying that the amount of payment is sufficient to acquire the digital asset for the value of the verified transaction information.

13. The system of claim 8, wherein the verified transaction information includes a time interval for which the value of the verified transaction information for acquiring the digital asset remains valid, and verifying the transaction information comprises:

verifying the transaction information further based on satisfying one or more conditions associated with the time interval.

14. The system of claim 13, wherein the one or more conditions include acquiring the digital asset for the value of the verified transaction information within the time interval.

15. A computer program product for acquiring a digital asset on a blockchain of a blockchain system, the computer program product comprising one or more non-transitory computer readable media having instructions stored thereon, the instructions executable by at least one processor of a server system to cause the at least one processor to:

retrieve a reference to an off-chain processing module from metadata of the digital asset on the blockchain, wherein the digital asset includes a non-fungible token;

request and receive, from the off-chain processing module based on the reference, transaction information for a transaction that acquires the digital asset on the blockchain, wherein the transaction information includes one or more functions of a smart contract of the blockchain system that acquire the digital asset, a value for acquiring the digital asset that dynamically changes, a digital asset identifier, and authentication information including a signature produced by using an encoding technique that encrypts at least the value and the digital asset identifier; and execute the one or more functions of the smart contract on the blockchain system with the transaction information for acquiring the digital asset for the value indicated in the transaction information;

wherein executing the one or more functions of the smart contract causes the blockchain system to:

generate a new signature by encrypting at least the value and the digital asset identifier within the transaction information using the encoding technique;

verify the transaction information was produced by the off-chain processing module based on comparing the signature within the authentication information to the new signature; and perform the transaction on the blockchain that acquires the digital asset in response to verification of the transaction information.

16. The computer program product of claim 15, wherein the non-fungible token includes a blockchain domain name.

17. The computer program product of claim 16, wherein performing the transaction comprises:

registering the digital asset on the blockchain.

18. The computer program product of claim 15, wherein verifying the transaction information comprises:

matching the new signature to the signature of the authentication information to verify the transaction information for acquiring the digital asset.

19. The computer program product of claim 18, wherein the transaction information includes an amount of payment, and verifying the transaction information further comprises:

verifying that the amount of payment is sufficient to acquire the digital asset for the value of the verified transaction information.

20. The computer program product of claim 15, wherein the verified transaction information includes a time interval for which the value of the verified transaction information for acquiring the digital asset remains valid, and verifying the transaction information comprises:

verifying the transaction information further based on satisfying one or more conditions associated with the time interval.

21. The computer program product of claim 20, wherein the one or more conditions include acquiring the digital asset for the value of the verified transaction information within the time interval.

\* \* \* \* \*